Figure 1:
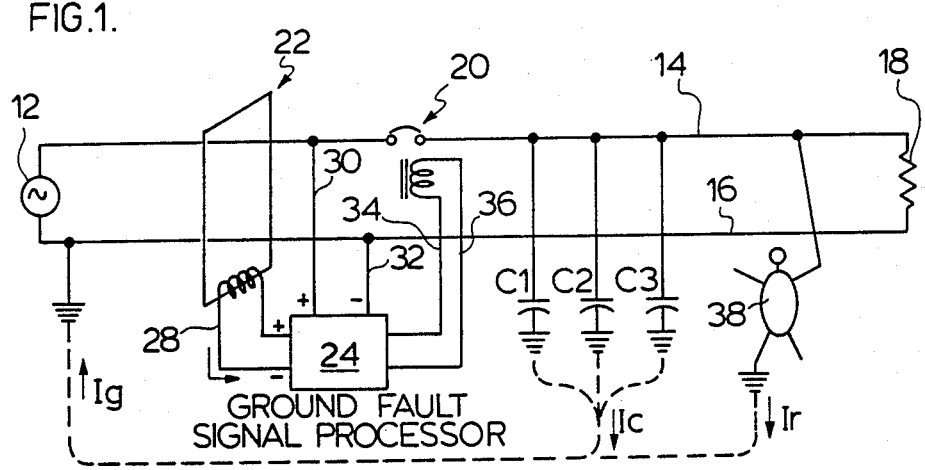

United States Patent [19]

Swift

[11] Patent Number: 4,796,144
[45] Date of Patent: Jan. 3, 1989

[54] GROUND FAULT DETECTOR

[75] Inventor: Glenn W. Swift, Winnipeg, Canada

[73] Assignee: Federal Pioneer Limited, Toronto, Canada

[21] Appl. No.: 88,736

[22] Filed: Aug. 24, 1987

[51] Int. Cl.$^4$ ............................................. H02H 3/08
[52] U.S. Cl. ..................................... 361/42; 361/93
[58] Field of Search .................. 361/42, 45, 49, 93; 324/522, 525; 340/650, 664

[56] References Cited

U.S. PATENT DOCUMENTS 4,385,336  5/1983  Takeshita et al. ................ 361/42 X
4,426,670  1/1984  Ilar et al. ........................ 361/42 X Primary Examiner—A. D. Pellinen
Assistant Examiner—Derek S. Jennings
Attorney, Agent, or Firm—Robert F. Delbridge; Arne I. Fors

[57] ABSTRACT

A ground fault detector for an AC circuit is responsive to resistive ground fault current but not to capacitive ground fault current. Current in the AC circuit is sensed and a corresponding signal current is produced. The direction of the signal current is reversed in each alternate half AC cycle without reversing the signal current in each intervening half cycle, the unreversed and the reversed signal current is averaged, and the presence of averaged signal current above a predetermined value is sensed to indicate significant resistive ground fault current.

2 Claims, 2 Drawing Sheets

GROUND FAULT DETECTOR

This invention relates to ground fault detectors for AC circuits.

Ground fault current may be resistive and/or capacitive. Many ground fault detectors do not distinguish between resistive current and capacitive current. Resistive current may be harmful because it may signify current flowing through a person, whereas capacitive current is usually harmless. Significant capacitive ground fault current may for example occur with underground cable power distribution systems, with there consequently being a necessity for a ground fault detector which detects significant resistive ground fault current but does not respond to capacitive ground fault current. However, known ground fault detectors for this purpose are relatively complex.

It is therefore an object of the invention to provide a ground fault detector which is sensitive to significant resistive ground fault current but not to capacitive ground fault current, and which is less complex than known ground fault detectors for this purpose.

According to the invention, a ground fault detector comprises means for sensing current in an AC circuit and producing a corresponding signal current, means for reversing the direction of said signal current in each alternate half AC cycle without reversing the signal current in each intervening half cycle, means for averaging the unreversed and the reversed signal current, and means for sensing the presence of averaged signal current above a predetermined value to indicate significant resistive ground fault current.

The reversing means may comprise a pair of switches in parallel between the sensing means and the averaging means, means for alternately opening and closing said switches at the end of each half AC cycle, and an inverter to reverse the current passing through one switch when closed to the averaging means.

Figure 2:
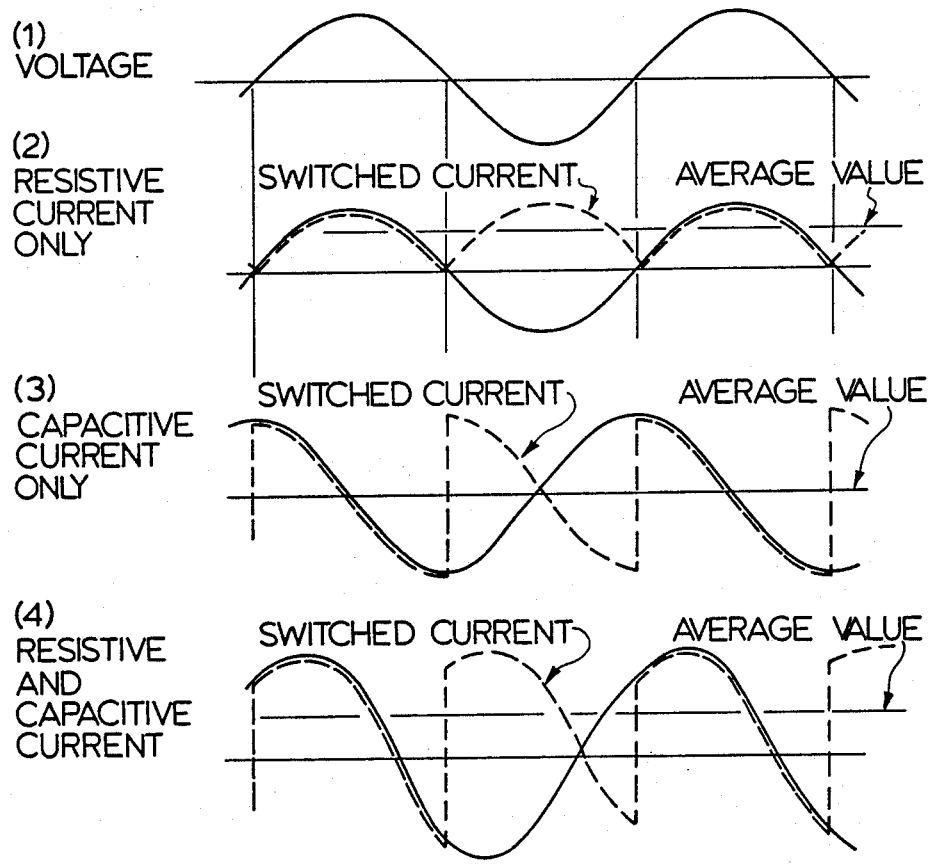
Figure 3:
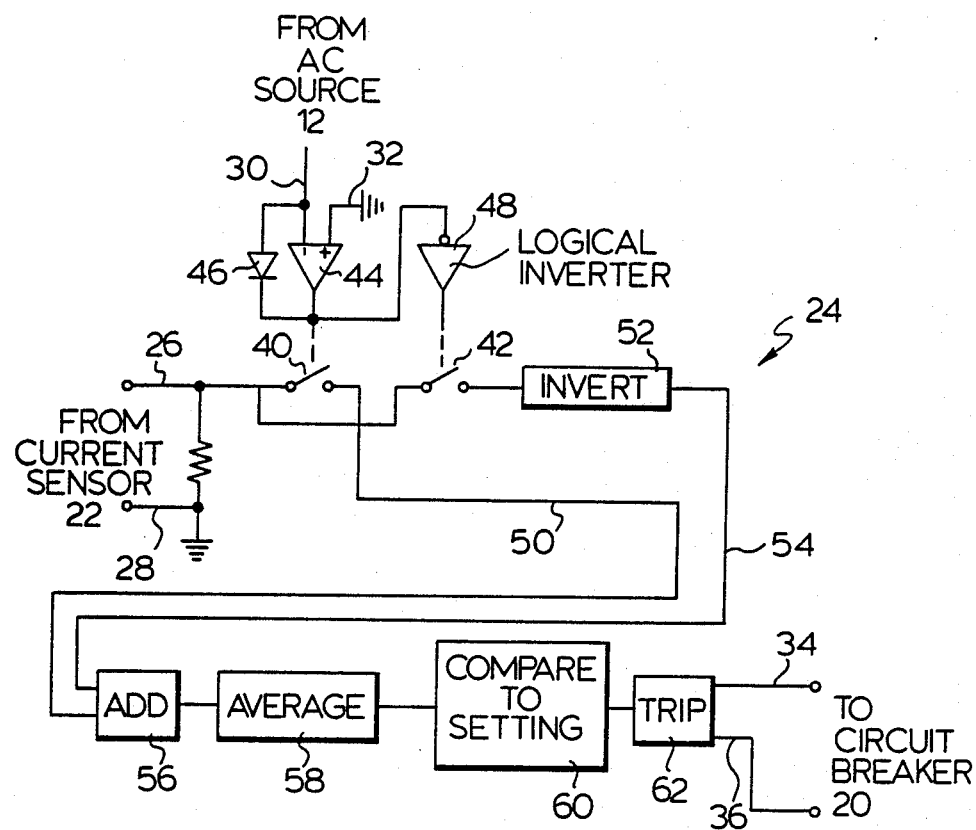

One embodiment of the invention will now be described, by way of example, with reference to accompanying drawings, of which:

FIG. 1 is a circuit diagram of an AC circuit incorporating a ground fault detector in accordance with the invention, FIG. 2 shows the concept of the invention in graphical form, and FIG. 3 is a circuit diagram of a ground fault signal processor in accordance with the invention.

Referring first to FIG. 1, an AC circuit comprises an AC power source 12 with a live line 14 and grounded neutral line 16 connected to a load 18, with the live line incorporating a circuit breaker 20. A current sensor 22, i.e. a current transformer, surrounds the live line 14 and neutral line 16 to sense current in the live line 14 which is not also flowing in the neutral line 16, i.e. ground fault current. A ground fault current signal processor 24 in accordance with the invention is connected to the current sensor 22 by lines 26, 28 to receive a corresponding ground fault signal current, and is also connected to the AC power source 12 by lines 30, 32 so that the AC power source 12 supplies a voltage reference signal to the processor 24. The processor 24 is also connected by lines 34, 36 to circuit breaker 20.

As previously mentioned, ground fault currents may be capacitive and/or resistive. Capacitive ground fault currents Ic are represented in FIG. 1 by capacitors C1, C2, C3 between live line 14 and ground. Such currents are usually harmless. On the other hand, resistive ground fault currents may be dangerous. FIG. 1 also indicates a resistive ground fault current Ir flowing from live line 16 through a person 38 to ground. Th total ground fault current is thus Ig=Ic+Ir.

FIG. 2 shows the concept of the invention. Line (1) represents the sinusoidal voltage of the AC power source 12. Line (2) shows the resistive ground fault current Ir as the solid sinusoidal line. The dotted line shows the current wave form after current reversal in each alternate half cycle in accordance with the invention. When the current has been changed in this manner, it has an average value as indicated by the solid straight line.

Line (3) of FIG. 2 shows the capacitive ground fault current Ic as the solid sinusoidal line. The dotted line shows the current wave form after current reversal in each alternate half cycle in accordance with the invention. It will be readily apparent from line (3) that the average value of the changed current is zero, since the capacitive current is 90° out of phase with the voltage shown in line (1).

Line (4) shows the combined capacitive and resistive ground fault current Ig as the solid sinusoidal line. The dotted line shows the current wave form after alternate half cycle reversal, and the solid straight line shows the average value of the changed current.

Thus, when a signal indicative of resistive ground fault current has been reversed in each alternate half cycle, there will be signal current flow with an appropriate average value. The present invention utilizes this concept to detect resistive ground fault current whether or not there is also capacitive ground fault current flow.

FIG. 3 shows a ground fault current signal processor 24 in accordance with the invention. The ground fault current signal from current sensor 22 is fed to two switches 40, 42 in parallel. Opening and closing of switches 40, 42 is controlled by control means comprising an amplifier 44 whose signal input is the AC power source 12. The output from amplifier 44 is connected to switch 40 and inverter 48, and the input terminal of amplifier 44 is connected to the output terminal of amplifier 44. The switch control means controls switches 40, 42 such that, during alternate half cycles of the AC source 12, switch 40 is closed and switch 42 is open and, during intervening alternate half cycles, switch 42 is open and switch 42 is closed.

The signal passing through switch 40 in alternate half cycles passes along line 50 to adder 56, and the signal passing through switch 42 in intervening half cycles passes along line 54 through inverter 52 to adder 56, the inverter 52 operating to reverse the current in the intervening half cycles. The signals are combined in adder 56 to provide a signal corresponding to the dotted sinusoidal signal lines in FIG. 2. The combined signal is averaged in averager 58 to provide a signal of average current corresponding to the full straight lines in FIG. 2. The average current signal is then passed to comparator 60, where the current signal is compared to a predetermined set value. If the average current signal is greater than the set value, a signal is sent by comparator 60 to trip 62 which in turn causes operation of the circuit breaker 20 to interrupt live line 14.

The simplicity and other advantages of the invention will be clear to a person skilled in the art from the foregoing description of a preferred embodiment. Other embodiments will also be readily apparent, the scope of the invention being defined in the appended claims.

What I claim as new and desire to protect by Letters Patent of the United States is:

1. A ground fault detector for an AC circuit, said detector being responsive to resistive ground fault current but not to capacitive ground fault current and comprising:

means for sensing current in the AC circuit and producing a corresponding signal current, means for reversing the direction of said signal current in each alternative half AC cycle without reversing the signal current in each intervening half cycle to provide unreversed and reversed signal current, means for averaging the unreversed and the reversed signal current, and means for sensing the presence of averaged signal current above a predetermined value to indicate significant resistive gorund fault current.

2. A ground fault detector according to claim 1 wherein said reversing means comprises a pair of switches in parallel between the current sensing means and the averaging means, means for alternately opening and closing said switches at the end of each half AC cycle, and an inverter to reverse the current passing through one switch when closed to the averaging means.

* * * * *